Patented May 8, 1951

2,551,702

UNITED STATES PATENT OFFICE 2,551,702

PROCESS FOR THE PRODUCTION OF POLYAMIDES BY POLYMERIZATION OF LACTAMS

Jiří Procházka, Prague, Czechoslovakia, assignor to Bata narodni podnik, Zlin, Czechoslovakia No Drawing. Application May 17, 1947, Serial No. 748,850. In Germany July 28, 1943

Section 1, Public Law 690, August 8, 1946
Patent expires July 28, 1963

3 Claims. (Cl. 260—78)

It has been found that addition of lactic acid or of its anhydroderivatives, especially addition of dilactic acid and of lactide, when producing polyamides by polymerization of lactams, offers advantages in several respects. The lactic acid and its anhydroderivatives catalyze the polymerization and stabilize at the same time the obtained polymers on a certain level of polymerization, depending on the amount of added ingredients. Further heating or obtention of the polyamides in a molten state changes only to a small extent the internal viscosity which may serve as an indication for the extent of polymerization. This circumstance is important from the practical point of view since by an excessive rise of the viscosity, the spinning of the polyamides from the molten mass would be obstructed.

The favourable influence of the lactic acid and of its anhydroderivatives may be explained in several ways. It is probable that the lactic acid gradually furnishes the water necessary for the polymerization of the lactam, reducing at the same time the melting point of the melted mass and its viscosity. Therefore the polymerization continues very smoothly and its speed is favourable already at lower temperatures. Besides, towards the end of the polymerization the lactic acid or its anhydroderivatives react and form end-groups, thereby stabilizing the obtained polymers. A further heating does not change the viscosity any further. This fact confirms that the polymer, once formed, retains the length of its chain. As mentioned above, the obtained internal viscosity of the molten mass i. e. the degree of polymerization too depend on the amount of the added lactic acid or equivalent agent. Therefore, by adding a certain amount of lactic acid a certain product is obtained, the qualities of which can be established in advance.

It is advantageous to add 1–5% of lactic acid or of its anhydroderivatives. By adding a higher amount of lactic acid or of its anhydroderivates, lower polymers are obtained, which are less suitable for spinning or uncapable to be spun at all. A smaller addition, i. e. less than 1% may, under certain circumstances, result in the production of higher polymers with a higher internal viscosity.

*Example*

100 parts of 6-caprolactam are polymerized with 2 parts of lactic acid in a closed vessel by heating. After 6 hours of treatment the molten mass has an internal viscosity of 0.72 and can be spun easily. After 100 hours of heating the internal viscosity rises only insignificantly e. g. to 0.78, the qualities of the molten mass and those of the threads produced from it remaining unchanged.

The influence of the lactic acid and of its anhydroderivatives on higher polymerizable lactams as for instance on 7-oenantholactam etc. is the same.

Having now particularly described and ascertained the nature of my invention and in what manner the same is to be performed, I declare that what I claim is:

1. Process for producing polyamides consisting of polymerizing 6-caprolactam in the presence of a catalyst selected from the group consisting of lactic acid, dilactic acid and lactide in an amount of between 1 and 5% of said 6-caprolactam.

2. Process for producing polyamides consisting of polymerizing 6-caprolactam in the presence of between 1 and 5% of dilactic acid.

3. Process for producing polyamides consisting of polymerizing 6-caprolactam in the presence of between 1 and 5% of lactide.

JIŘÍ PROCHÁZKA.

REFERENCES CITED

The following references are of record in the file of this patent:

UNITED STATES PATENTS

| Number | Name | Date |
|---|---|---|
| 2,071,250 | Carothers | Feb. 16, 1937 |
| 2,312,879 | Christ | Mar. 2, 1943 |
| 2,440,516 | Kropa | Apr. 27, 1948 |

FOREIGN PATENTS

| Number | Country | Date |
|---|---|---|
| 245,374 | Switzerland | Nov. 15, 1946 |

OTHER REFERENCES

Bernthsen-Sudborough, A Textbook of Organic Chemistry, New Edition 1931, p. 223.